(No Model.)
F. S. CULVER.
FIREPROOFING COMPOSITION FOR WALL COVERINGS.
No. 493,152. Patented Mar. 7, 1893.
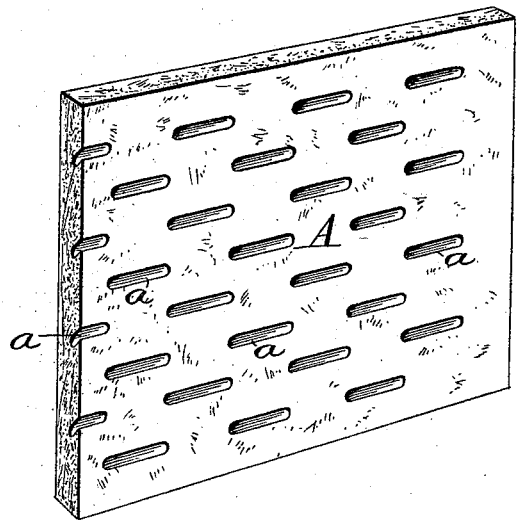
Witness:
James F. Duhamel
Horace A. Dodge.
FRANK S. CULVER, Inventor,
by Dodge Sons,
his Attys.

UNITED STATES PATENT OFFICE.

FRANK S. CULVER, OF WASHINGTON, DISTRICT OF COLUMBIA, ASSIGNOR, BY DIRECT AND MESNE ASSIGNMENTS, OF TWO-THIRDS TO CARROLL B. HOFFMAN, OF BALTIMORE, MARYLAND, AND NEWTON H. CULVER, OF DETROIT, MICHIGAN.

FIREPROOFING COMPOSITION FOR WALL-COVERINGS.

SPECIFICATION forming part of Letters Patent No. 493,152, dated March 7, 1893.

Application filed February 25, 1892. Serial No. 422,725. (No specimens.)

*To all whom it may concern:*

Be it known that I, FRANK S. CULVER, a citizen of the United States, residing at Washington, in the District of Columbia, have invented certain new and useful Improvements in Fireproofing Compositions, &c., of which the following is a specification.

My invention relates to fire-proofing compositions suitable for covering walls and like surfaces and for the production of backing slabs, sheets and the like, designed to serve as a support for mortar in the plastering of walls, partitions &c.

The composition consists of the ingredients stated below, in substantially the proportions set forth, said proportions being by weight. It is, however, to be understood that I do not restrict myself arbitrarily to the proportions stated, but reserve the right to vary the same within reasonable limits,—the percentage of asbestus particularly being susceptible of variations, and it being desirable to employ as large a percentage thereof as can be conveniently used.

Formula—Asbestus fiber or talc fiber, nine per cent.; blue clay (pulverized) fifteen per cent.; plaster of paris, fifty per cent.; Acme cement, twenty-five per cent.; long fiber (palmetto, hemp, jute, or the like) one per cent.

These proportions are found to give excellent results and are deemed best under ordinary circumstances, but may be varied according to the peculiar conditions of use.

The clay employed by preference is a variety of blue clay found in the State of Michigan, and somewhat closely analogous in its composition to fuller's earth, but other varieties of clay may be used.

The asbestus fiber and the talc fiber may, for the purposes of the present invention, be considered the equivalents of each other; and hence, when I refer in the claim to "asbestus fiber" I mean to include the asbestus fiber or its described equivalent, the talc fiber.

The cement referred to in this specification under the name of "Acme cement" is a non-hydraulic cement found and mined as a natural product in the State of Kansas. A quantitative analysis of an average sample in the natural state or before calcination shows the following composition:

| | |
|---|---|
| Carbonic acid | 4.38 |
| Sulphuric acid | 44.07 |
| Silicic acid | 4.21 |
| Alumina | 0.74 |
| Magnesia | 1.14 |
| Lime | 37.71 |
| Soda | 0.53 |
| Potash | 0.05 |
| Water | 7.89 |
| | 100.72 |

The ingredients above recited, in approximately the proportions stated, are intimately mixed together in a dry state and are then moistened and worked together in a pug mill or otherwise, and finally introduced into a mold of suitable proportions, or applied directly to a wall or other surface.

A convenient size of slab, and one commonly adopted for the trade, is thirty-two inches in length, thirteen and one-half in width, and one-half inch in thickness.

The asbestus fiber, or talc fiber, the plaster of paris, and the cement produce a fireproof composition; the flocky or fluffy asbestus fiber used in large quantity as indicated, gives to the slab a spongy and elastic structure, which is of the greatest importance for the reason that it permits the slab to spring or bend appreciably without fracture, and in the event of shrinkage or movement of the timbers to which the slabs are applied, permits the nail heads to sink into or to change their position in the backing without fracture thereof, and without injury to or separation from the facing.

The long fibers of jute, hemp, palmetto or the like, give a strength to the slab as a whole, and materially supplement the elasticity of the asbestus fiber or talc fiber.

The composition above set forth usually sets in from eight to ten minutes when made of the thickness stated.

The use of clay is not essential, though desirable, good results being attainable without the employment of any clay.

While as above indicated, it is contemplated and preferred that the composition be made into the form of a slab or sheet, it is obvious that it may be used in other ways, as for instance by applying it in a plastic state directly to the surface to be protected.

The slab or sheet made as above described is very convenient and satisfactory in use, permitting as it does the formation of nail holes or holes for other fastenings close to the edges without liability of fracture or of tearing out.

The composition while in the mold may be subjected to pressure, if deemed advisable.

Having thus described my invention, what I claim is—

The herein described fire-proofing composition, consisting of asbestus fiber, clay, plaster of paris, Acme cement, and a binding fiber, in substantially the proportions stated.

In witness whereof I hereunto set my hand in the presence of two witnesses.

FRANK S. CULVER.

Witnesses:
WILLIAM W. DODGE,
THOS. S. HOPKINS.